(12) United States Patent
Ray et al.

(10) Patent No.: US 9,536,267 B2
(45) Date of Patent: *Jan. 3, 2017

(54) RESOLVING PAIRWISE LINKS TO GROUPS

(71) Applicant: Wal-Mart Stores, Inc., Bentonville, AR (US)

(72) Inventors: Andrew Benjamin Ray, Bentonville, AR (US); Nathaniel Philip Troutman, Seattle, WA (US)

(73) Assignee: Wal-Mart Stores, Inc., Bentonville, AR (US)

(*) Notice: Subject to any disclaimer, the term of this patent is extended or adjusted under 35 U.S.C. 154(b) by 0 days.

This patent is subject to a terminal disclaimer.

(21) Appl. No.: 15/011,116

(22) Filed: Jan. 29, 2016

(65) Prior Publication Data

US 2016/0148320 A1 May 26, 2016

Related U.S. Application Data

(63) Continuation of application No. 13/907,723, filed on May 31, 2013, now Pat. No. 9,298,753.

(51) Int. Cl.
G06F 7/00 (2006.01)
G06Q 40/00 (2012.01)
G06F 17/30 (2006.01)

(52) U.S. Cl.
CPC ......... *G06Q 40/12* (2013.12); *G06F 17/30241* (2013.01); *G06F 17/30303* (2013.01); *G06F 17/30598* (2013.01)

(58) Field of Classification Search
None
See application file for complete search history.

(56) References Cited

U.S. PATENT DOCUMENTS

| 8,046,348 B1 | 10/2011 | Rehling et al. |
| 2006/0116120 A1 | 6/2006 | Hurst |
| 2006/0221837 A1 | 10/2006 | Gardner |

*Primary Examiner* — Thu Nga Nguyen
(74) *Attorney, Agent, or Firm* — Bryan Cave LLP

(57) ABSTRACT

In some embodiments, a method can comprise accessing one or more neighborhood data structures, at least a portion of the one or more neighborhood data structures are active. In many embodiments, the one or more neighborhood data structures each comprise a label comprising a record identifier, the record identifier corresponding to a specified record of the one or more records, a neighborhood comprising a list of record identifiers for other records linked to the specified record of the one or more records by a pairwise link, and a message for each of the other records linked to the specified record of the one or more records, the message comprising the label and an activity state indicator, the activity state indicator indicating if the neighborhood data structure is active. Other embodiments of related methods and systems are also provided.

20 Claims, 7 Drawing Sheets

300

For one or more iterations over a plurality of records until a stop condition is satisfied, each iteration including:

Accessing a plurality of active neighborhood data structures, each active neighborhood data structure corresponding to a different specified record from among the plurality of records, each neighborhood data structure including a record identifier as a label, the record identifier corresponding to a record included in the plurality of records, the neighborhood data structure also including an activity state indicator and a neighborhood, the activity state indicator indicating whether or not the neighborhood data structure is active, the neighborhood including list of record identifiers for other records expressly linked to the specified record by a pairwise link, the other records also included in the plurality of records
301

For each neighborhood data structure, creating a message for each of the other records expressly linked to the record, the message including the label and the activity indicator for the neighborhood data structure
302

Subsequent to creating the messages, grouping neighborhood data structures and messages by record identifier such that each group includes one neighborhood data structures and one or more messages
303

For each grouping of a neighborhood data structure and messages, setting the label for the neighborhood data structure to the minimum record identifier included in the neighborhood data structure and messages
304

When the minimum record identifier for a grouping of a neighborhood data structure and messages is the record identifier for the specified record, removing the neighborhood data structure from plurality of active neighborhood data structure by setting the activity indicator to indicate that the neighborhood data structure is not active
305

*Fig. 3*

Computer System        600

Neighborhood Creation:

Group Links 510 By Record ID 511, Such That Each Link 510 Is In Two Groups. For Each Group, Create A Neighborhood 513 With An Initial State 514 Of Active = True And Label = Record Id.
601

Message Passing Iteration:

Map Phase:

For Each Neighborhood 513, If It Is Active 523, Create Messages 520 For Each Record Id 511 Of A Neighbor 516 In The Neighbor List 515 With A Payload 521 Consisting Of The Current Label 522 In The State 514 Of The Neighborhood 513.
602

Reduce Phase:

Messages 520 And Neighborhoods 513 Are Grouped By Record Id 511. Each Group Consists Of One Neighborhood 513 And Some Number Of Messages 520.
603

In Each Group The State 514 Of The Neighborhood 513 Is Updated As A Function Of The Current State 514 And The Payload 521 Of The Messages 520.   604

A Function Takes The Minimum Of The Labels Between The State And The Messages As The New Label For The State And Set Active To True If The Label Has Changed And False Otherwise.  605

Stopping Condition:

If All Neighborhoods Are Not Active Or Some Other Stopping Condition Has Been Reached, Such As A Maximum Of Iterations, Go On To The Next Step. Otherwise, Do Another Iteration Of Message Passing.   606

Match Key Creation:

For Each Neighborhood 513, Write Out Record Id 511 With The Corresponding Label 522.  607

*Fig. 6*

RESOLVING PAIRWISE LINKS TO GROUPS

CROSS-REFERENCE TO RELATED APPLICATIONS

The present application claims priority to and is a continuation of U.S. patent application Ser. No. 13/907,723, entitled "Multiple Sign Controller," filed on May 31, 2013, which is hereby incorporated by reference.

BACKGROUND

1. Field of the Invention

The present invention relates generally to identifying groups of records correspond to the same entity with larger datasets, and, more particularly, to resolving a plurality of pairwise links of records into one or more groups of records corresponding to the same entity.

2. Related Art

There are many avenues for a customer to acquire goods or products that meet their needs or wants. One way for a customer to acquire goods is through the use of a retailer. Depending on the market strategy of the retailer, there are many different avenues for retailers to sell products. For example, retailers can sell products in physical store locations (e.g., department stores, discount stores, warehouse stores, supermarkets, etc.), online, and even through vending machines.

Given the large number of choices for a consumer to acquire products, it becomes expedient for retailers to do their best to attract and retain customers. For example, retailers may need to keep their prices low relative to their competition to attract and retain customers. Further, retailers may need to provide a good or product that is not readily available through other retail options. Without staying competitive, retail stores may have a weakened customer base, and, in turn, lose their profitability.

In order for a retail store to better meet the needs of their customers, retail stores have an interest in the shopping patterns of their customers. As understanding of customer shopping habits and tendencies increases, a retailer can offer incentives such as coupons or rebates to entice its customers to make more purchases or purchase items that may be unfamiliar to a customer. This both improves the customer shopping experience and increases retailer profit margin. Also, customer shopping experience improves, customers may be more likely to refer their friends to user the retailer (e.g., visit a store, go to the Website, etc.).

There are many ways for a store to observe the shopping habits of their customers. One way is issuing a membership card to its customers. As the customer checks out, the customer card is scanned. The store database can then keep track of which items the customer purchases, and how often the purchases are made. The store incentivizes the customer to use the card by offering reduced prices for purchases made with the card.

In addition to membership cards, retail stores can also track the shopping patterns of their customers through a customer's online activity. The store can track which items the customer viewed on their website, which items the customer searched for using the website's search feature, which items they added to their online cart, and which items they purchased.

Further, if the customer pays with a check or credit card, the store can determine if the customer has a profile within the store's database, and can associate the customer's purchases, credit card, checking account, etc., with the customer's profile.

Given the many avenues for customer's to make purchases, it becomes increasingly difficult for a retailer to match a particular customer to all of their interactions with the retailer. For example, some of the customer's purchases may be made online with one credit card, other purchases may be made at a store with a different credit card, and remaining purchases may be made using a membership card and paying by cash or check. In addition, many retail stores have more than one type of retail store. For example, some retailers may operate both a discount store and a warehouse store. Identifying a customer of the discount store and a customer of the warehouse store as the same customer can be difficult.

As retail stores accumulate customer data through purchases or other interactions, an enormous amount of data is created, for example, for some retailers billions of records. As mentioned previously, many of these records may have been created through different types of customer interaction; whether they bought the items online, with a membership card, with a credit card, at the retailer's discount store, at the retailer's warehouse store, or some combination thereof. It can be very challenging to sort through the vast amount of records in order to associate each record with the customer that created the record.

BRIEF DESCRIPTION OF THE DRAWINGS

The specific features, aspects and advantages of the present invention will become better understood with regard to the following description and accompanying drawings where:

FIG. 3 illustrates a flow chart of an example method for resolving pairwise links into groups.

FIG. 6 illustrates a flow chart of an example method for resolving pairwise links into groups.

DETAILED DESCRIPTION

Figure 1:
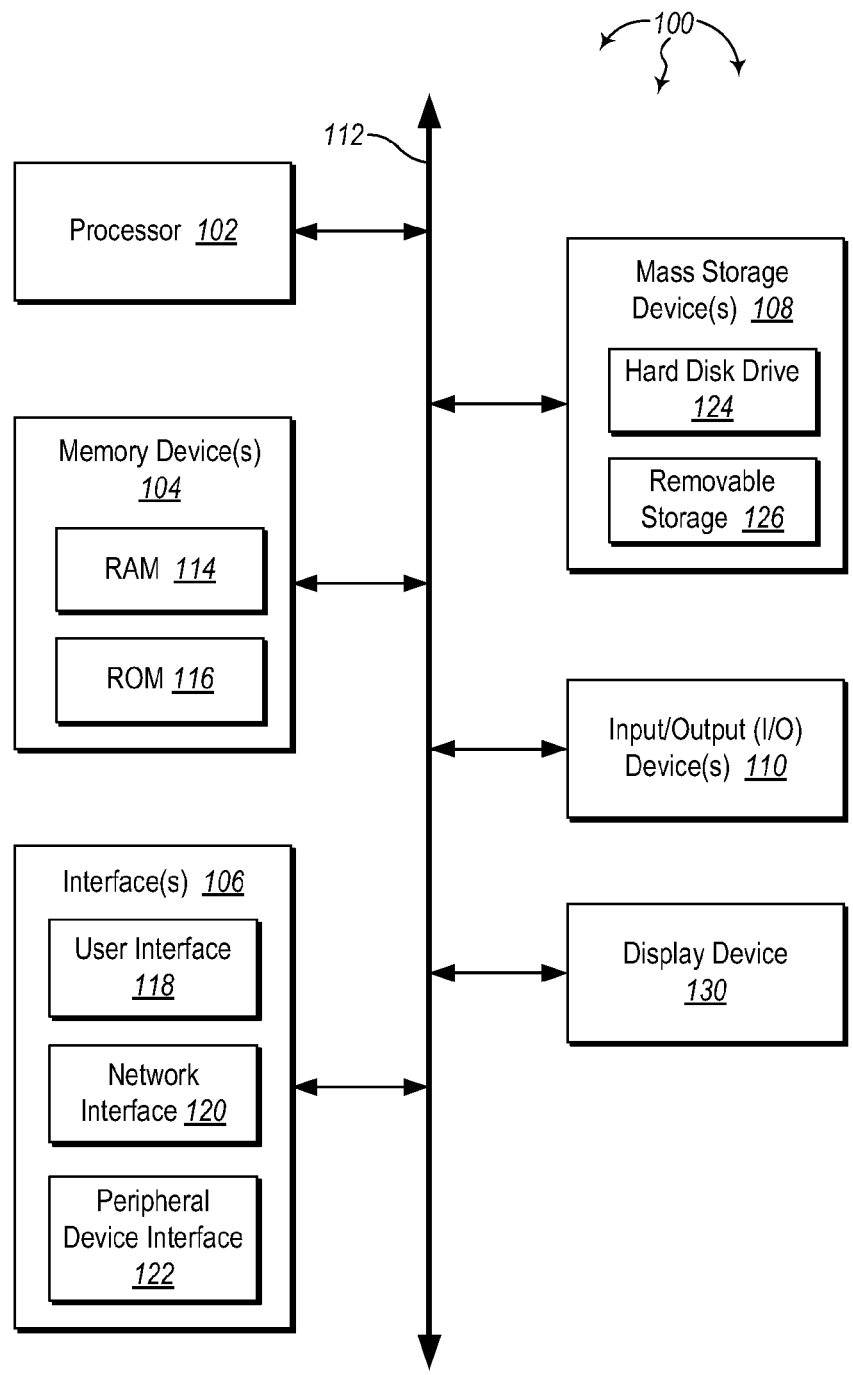
FIG. 1 illustrates an example block diagram of a computing device.

Various embodiments of resolving pairwise links to groups comprise a system. In some embodiments, the system can comprise one or more processing modules and one or more non-transitory storage modules storing computing instructions configured to run on the one or more processing modules and perform acts. In many embodiments, the acts can comprise accessing one or more neighborhood data structures, at least a portion of the one or more neighborhood data structures are active. The one or more neighborhood data structures each can comprise a label comprising a record identifier, the record identifier corresponding to a specified record of the one or more records, a neighborhood comprising a list of record identifiers for other records linked to the specified record of the one or more records by a pairwise link, and a message for each of the other records linked to the specified record of the one or more records, the message comprising the label and an activity state indicator, the activity state indicator indicating if the neighborhood data structure is active. In many embodiments, the acts further comprise grouping one of the one or more neighborhood data structures and the message the one of the one or more neighborhood data structure by the record identifier of the one of the one or more neighborhood data structures, setting the label for one of the one or more neighborhood data structure in the group to a minimum record identifier, and removing the one of the one or more neighborhood data structures from the one or more neighborhood data structures that are active when the minimum record identifier for the one of the one or more neighborhood data structures is the record identifier for the specified record of a particular neighborhood data structure of the one or more neighborhood data structures.

Many embodiments comprise a method. The method can comprise accessing one or more neighborhood data structures, at least a portion of the one or more neighborhood data structures are active. The one or more neighborhood data structures each can comprise a label comprising a record identifier, the record identifier corresponding to a specified record of the one or more records, a neighborhood comprising a list of record identifiers for other records linked to the specified record of the one or more records by a pairwise link, and a message for each of the other records linked to the specified record of the one or more records, the message comprising the label and an activity state indicator, the activity state indicator indicating if the neighborhood data structure is active. In many embodiments, the method can further comprise grouping one of the one or more neighborhood data structures and the message the one of the one or more neighborhood data structure by the record identifier of the one of the one or more neighborhood data structures, setting the label for one of the one or more neighborhood data structure in the group to a minimum record identifier, and removing the one of the one or more neighborhood data structures from the one or more neighborhood data structures that are active when the minimum record identifier for the one of the one or more neighborhood data structures is the record identifier for the specified record of a particular neighborhood data structure of the one or more neighborhood data structures.

A number of embodiments comprise a computer program product. In some embodiments, the computer program product can comprise one or more computer storage devices having stored thereon computer-executable instructions that, when executed at a processor, perform a method. The method can comprise accessing one or more neighborhood data structures, at least a portion of the one or more neighborhood data structures are active. The one or more neighborhood data structures each can comprise a label comprising a record identifier, the record identifier corresponding to a specified record of the one or more records, a neighborhood comprising a list of record identifiers for other records linked to the specified record of the one or more records by a pairwise link, and a message for each of the other records linked to the specified record of the one or more records, the message comprising the label and an activity state indicator, the activity state indicator indicating if the neighborhood data structure is active. In many embodiments, the method can further comprise grouping one of the one or more neighborhood data structures and the message the one of the one or more neighborhood data structure by the record identifier of the one of the one or more neighborhood data structures, setting the label for one of the one or more neighborhood data structure in the group to a minimum record identifier, and removing the one of the one or more neighborhood data structures from the one or more neighborhood data structures that are active when the minimum record identifier for the one of the one or more neighborhood data structures is the record identifier for the specified record of a particular neighborhood data structure of the one or more neighborhood data structures.

The present invention extends to methods, systems, and computer program products for resolving pairwise links to groups. A computer system iterates over a plurality of records until a stop condition is satisfied. For each iteration, a plurality of active neighborhood data structures is accessed. Each active neighborhood data structure corresponds to a different specified record from among the plurality of records. Each neighborhood data structure includes a record identifier as a label. The record identifier corresponds to a record included in the plurality of records. Each neighborhood data structure also includes an activity state indicator and a neighborhood. The activity state indicator indicates whether or not the neighborhood data structure is active. The neighborhood includes a list of record identifiers for other records expressly linked to the specified record by a pairwise link. The other records also included in the plurality of records.

During a map phase, for each neighborhood data structure, a message is created for each of the other records expressly linked to the record. The message includes the label and the activity indicator for the neighborhood data structure. Subsequent to creating the messages, data structures and messages are grouped by record identifier. Accordingly, each grouping includes one neighborhood data structure and one or more messages.

During a reduce phase, for each grouping of a neighborhood data structure and messages, the label for the neighborhood data structure is set to the minimum record identifier included in the neighborhood data structure and messages. When the minimum record identifier for a grouping of a neighborhood data structure and messages is the record identifier for the specified record, the neighborhood data structure is removed from plurality of active neighborhood data structure by setting the activity indicator to indicate that the neighborhood data structure is not active.

In some embodiments, a stop condition is detecting that no neighborhood data structure are active. In other embodiments, a stop condition is reaching a specified maximum number of iterations.

Some embodiments include a neighborhood creation phase where the plurality of active neighborhood data structures is created. Some embodiments also include a group label creation phase where neighborhood data structures are transformed to groups by writing out the record identifier and label for each neighborhood data structure.

During each phase, data can be written to disk as it is processed so that larger (and potentially extremely large) datasets can be handled.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Hardwired connections can include, but are not limited to, wires with metallic conductors and/or optical fibers. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. RAM can also include solid state drives (SSDs or PCIx based real time memory tiered Storage, such as FusionIO). Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention can also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service (SaaS), Platform as a Service (PaaS), Infrastructure as a Service (IaaS), and deployment models (e.g., private cloud, community cloud, public cloud, hybrid cloud, etc.). Databases and servers described with respect to the present invention can be included in a cloud model.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the following description and Claims to refer to particular system components. As one skilled in the art will appreciate, components may be referred to by different names. This document does not intend to distinguish between components that differ in name, but not function.

FIG. 1 illustrates an example block diagram of a computing device 100. Computing device 100 can be used to perform various procedures, such as those discussed herein. Computing device 100 can function as a server, a client, or any other computing entity. Computing device 100 can perform various communication and data transfer functions as described herein and can execute one or more application programs, such as the application programs described herein. Computing device 100 can be any of a wide variety of computing devices, such as a mobile telephone or other mobile device, a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer storage media, such as cache memory.

Memory device(s) 104 include various computer storage media, such as volatile memory (e.g., random access memory (RAM) 114) and/or nonvolatile memory (e.g., read-only memory (ROM) 116). Memory device(s) 104 may also include rewritable ROM, such as Flash memory.

Mass storage device(s) 108 include various computer storage media, such as magnetic tapes, magnetic disks, optical disks, solid state memory (e.g., Flash memory), and so forth. As depicted in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, barcode scanners, microphones, monitors or other display devices, speakers, printers, network interface cards, modems, cameras, lenses, CCDs or other image capture devices, and the like.

Display device 130 includes any type of device capable of displaying information to one or more users of computing device 100. Examples of display device 130 include a monitor, display terminal, video projection device, and the like.

Interface(s) 106 include various interfaces that allow computing device 100 to interact with other systems, devices, or computing environments as well as humans. Example interface(s) 106 can include any number of different network interfaces 120, such as interfaces to personal area networks (PANs), local area networks (LANs), wide area networks (WANs), wireless networks (e.g., near field communication (NFC), Bluetooth, Wi-Fi, etc., networks), and the Internet. Other interfaces include user interface 118 and peripheral device interface 122.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

Figure 2:
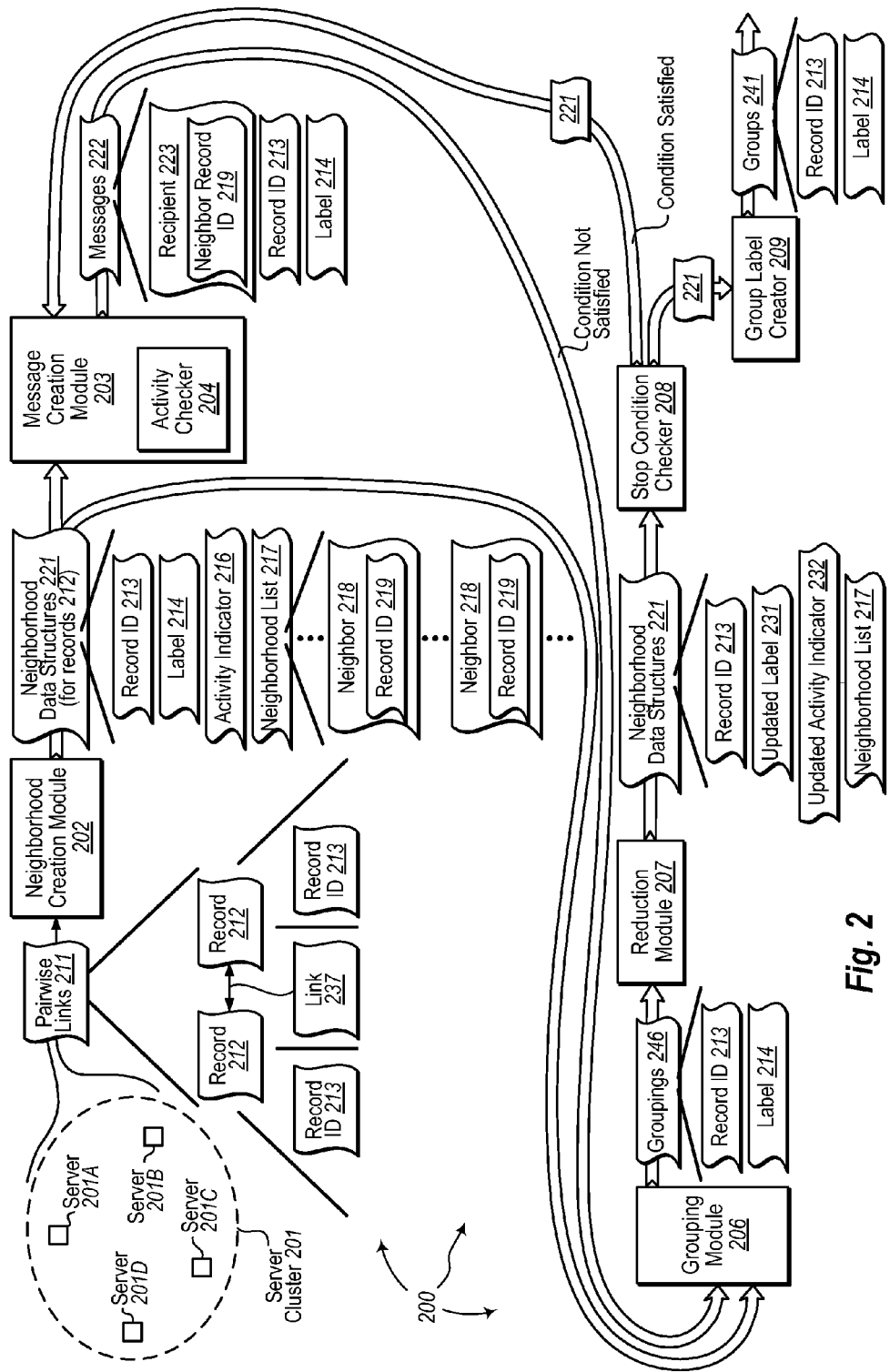
FIG. 2 illustrates an example computer architecture for resolving pairwise links into groups.

FIG. 2 illustrates an example computer architecture 200 for resolving pairwise links to groups. Referring to FIG. 2, computer architecture 200 includes server cluster 201, neighborhood creation module 202, message creation module 203, grouping module 206, reduction module 207, stop condition checker 208, and group label creator 209. Each of server cluster 201, neighborhood creation module 202, message creation module 203, grouping module 206, reduction module 207, stop condition checker 208, and group label creator 209 as well as their respective components can be connected to one another over (or be part of) a system bus and/or a network, such as, for example, a PAN, a LAN, a WAN, and even the Internet. Accordingly, server cluster 201, neighborhood creation module 202, message creation module 203, grouping module 206, reduction module 207, stop condition checker 208, and group label creator 209 as well as any other connected computer systems and their components, can create message related data and exchange message related data (e.g., near field communication (NFC) payloads, Bluetooth packets, Internet Protocol (IP) datagrams and other higher layer protocols that utilize IP datagrams, such as, Transmission Control Protocol (TCP), Hypertext Transfer Protocol (HTTP), Simple Mail Transfer Protocol (SMTP), etc.) over the network.

Server cluster 201 includes a plurality of servers including servers 201A-201D. Each server in server cluster 201 can store a plurality of pairwise links. Each pairwise link can expressly link two records together. In some embodiments, pairwise links stored in server cluster 201 link together records related to a retailer's interaction with their customers, such as, for example, sales transactions, offered promotions, etc. Servers in server cluster 201 can store pairwise links for various different portions of a retailers business, such as, for example, discount stores, warehouse stores, supermarkets, online, etc. Links and records in server cluster 201 can be stored in flat files or databases.

As depicted, server cluster 201 includes pairwise links 211. Each pairwise link 211 links together two records 212. Each of the two records 212 can store different customer interaction data that is expressly linked to one another. For each pairwise link 211, link 237 can indicate an express relationship between the two records 212. In some embodiments, link 237 can be associated with metadata indicating a level of confidence in the link as well as the owner of the link (e.g., the algorithm that created the link). Each record 212 includes a record ID 213 identifying the record 212.

The number of links and records in server cluster 201 may be so large that other computing systems owned by the retailer lack sufficient memory resource to resolve the pairwise links in memory.

In general, neighborhood creation module 202 is configured to access a plurality of pairwise links and create neighborhood data structures from the plurality of pairwise links. Neighborhood creation module 202 can store created neighborhood data structures to a mass storage device (e.g., similar to mass storage device(s) 108). For example, neighborhood creation module 202 can access pairwise links 211 and create neighborhood data structures 221. After creation, neighborhood creation module 202 can store neighborhood data structures 221 to a local mass storage device.

A neighborhood data structure 221 can be created for each record 212 included in at least one pairwise link 211. Each neighborhood data structure 221 includes a record ID 213, a label 214, an activity indicator 216, and a neighborhood list 217. Record ID 213 is the identifier for the record 212 corresponding to the neighborhood data structure 221. Label 214 stores a minimum record ID 213 known to be linked to the record 212. Activity indicator 216 indicates if the neighborhood data structure 221 is active or inactive with respect to message passing. When a neighborhood data structure 221 is initially created, the activity indicator 216 is set to indicate that the neighborhood data structure 221 is active with respect to message passing.

Neighborhood list 217 further includes a list of neighbor records 218 (i.e., other records 212) that were linked to the record 212 by a pairwise link. The record ID 219 is indicated for each neighbor record 218. Record ID 219 and record ID 213 are from the same set of record IDs are used to distinguish record IDs for neighbor records from other users of record IDs.

In general, message creation module 203 is configured to access neighborhood data structures (e.g., previously stored at a local mass storage device) and create messages for delivery to records in corresponding neighborhood lists. Message creation module 203 can store created messages to a local mass storage device. For example, message creation module 203 can create messages 222 from neighborhood data structures 221. After creation, message creation module 203 can store messages 222 to a local mass storage device.

Each message can include a recipient 223 identified by neighbor record ID 219, a record ID 213 identifying the sending neighborhood data structures 221, and a label 214 from sending neighborhood data structures 221. Using messages 222 each record can make their neighbor records aware of a minimum record ID 213 to which they are linked.

Activity checker 204 is configured to check activity indicator 216 for each neighborhood data structure 221 prior to permitting creation of messages 222 for neighborhood data structure 221. When activity indicator 216 indicates that a neighborhood data structure 221 is not active. Messages 222 are not created for that neighborhood data structure 221.

In general, grouping module 206 is configured access neighborhood data structures and messages (e.g., previously stored at a local mass storage device) and create groupings of neighborhood data structures and messages based on record IDs 213. Grouping module 206 can store created groupings to a local mass storage device. For example, grouping module 206 can access neighborhood data structures 221 and messages 222 and create groupings 246. After creation, grouping module 206 can store groupings 246 to a local mass storage device.

Each grouping 246 includes a neighborhood data structure 221 and one or more messages 220. For each message 220 in a grouping 246, the neighbor record ID 219 used when creating the message 220 corresponds to the record ID 213 for neighborhood data structure 221.

In general, reduction module 207 is configured to access groupings (e.g., previously stored at a local mass storage device) and update labels and activity indicators in neighborhood data structures. Reduction module 207 can store update neighborhood data structures to a local mass storage device. For example, reduction module 207 can access groups 246 and update labels and activity indicators in neighborhood data structures 221. After updating, reduction module 207 can store updated neighborhood data structures 221 to a local mass storage device.

As depicted, reduction module 207 can output neighborhood data structures 221 with update labels 231 and updated activity indicators 232. Upon accessing a grouping 246, reduction module 207 determines the lowest record ID 213 for a label 214 in any of messages 220. Reduction module 207 then determines this lowest record ID 213 is less than the record ID 213 for label 214 in neighborhood data structures 221. If so, reduction module 207 replaces label 214 with updated label 231 (i.e., label 214 from the message 220). Updated label 231 stored the determined lowest record ID 213 from messages 220. If not, reduction module 207 updates activity indicator 232 to updated activity indicator 232 to indicate that the neighborhood data structure 221 is not active with respect to message passing (i.e., since no lower record ID 213 was identified). Updated activity indicator 232 prevents message creation for the neighborhood data structure 221 on subsequent iterations.

A minimum record identifier can be determined using a designated lexographical order for record identifiers.

Stop condition checker 208 is configured to check a stop condition on each iteration. When a stop condition is not satisfied, message creation module 203 is permitted to again access (updated) neighborhood data structure 221s and create messages 220. When a stop condition is satisfied, group label creator 209 is permitted to access (updated) neighborhood data structures 221.

In general, group label creator 209 is configured to access (updated) neighborhood data structures (e.g., previously stored at a local mass storage device) and create groups. Group label creator can store groups to a local mass storage device. For example, group label creator 209 can access (updated) neighborhood data structures 221 and create groups 241. After creation, group label creator 209 can store groups 241 to a local mass storage device.

For each (updated) neighborhood data structure 221, a corresponding group 214 contains a record ID 213 and an updated label 231 (or label 213 when no updates occur).

FIG. 3 illustrates a flow chart of an example method 300 for resolving pairwise links into groups. Method 300 will be described with respect to the components of computer architecture 200.

The acts of method 300 can be performed for one or more iterations over a plurality of records until a stop condition is satisfied. For example, one or more iterations of method 300 can be performed over pairwise links 211.

Method 300 includes accessing a plurality of active neighborhood data structures, each active neighborhood data structure corresponding to a different specified record from among the plurality of records, each neighborhood data structure including a record identifier as a label, the record identifier corresponding to a record included in the plurality of records, the neighborhood data structure also including an activity state indicator and a neighborhood, the activity state indicator indicating whether or not the neighborhood data structure is active, the neighborhood including list of record identifiers for other records expressly linked to the specified record by a pairwise link, the other records also included in the plurality of records (301). For example, message creation module 203 can access active neighborhood data structures 221 (i.e., neighborhood data structures 221 having an activity indicator 216 indicative being active for message passing).

Method 300 includes for each neighborhood data structure, creating a message for each of the other records expressly linked to the record, the message including the label and the activity indicator for the neighborhood data structure (act 302). For example, message creation module 203 can create messages 220.

Method 300 includes, subsequent to creating the messages, grouping neighborhood data structures and messages by record identifier such that each group includes one neighborhood data structures and one or more messages (303). For example, grouping module 206 can create groupings 246.

Method 300 includes, for each grouping of a neighborhood data structure and messages, setting the label for the neighborhood data structure to the minimum record identifier included in the neighborhood data structure and messages (304). For example, where appropriate, (when a message contains the minimum record identifier) reduction module 207 can update neighborhood data structures 221 with updated labels 231. When the record ID 213 in the neighborhood data structure 221 is the minimum record identifier, a label 214 is not updated.

Method 300 includes when the minimum record identifier for a grouping of a neighborhood data structure and messages is the record identifier for the specified record, removing the neighborhood data structure from plurality of active neighborhood data structure by setting the activity indicator to indicate that the neighborhood data structure is not active (305). For example, when the record ID 213 in the neighborhood data structure 221 is the minimum record identifier, reduction module 207 can update activity indicator 216 to updated activity indicator 232. Updated activity indicator 232 can indicate that the corresponding neighborhood data structure 221 is not active with respect to message passing.

When the stop condition is satisfied, group label creation 209 can write out groups 241.

Figure 4:
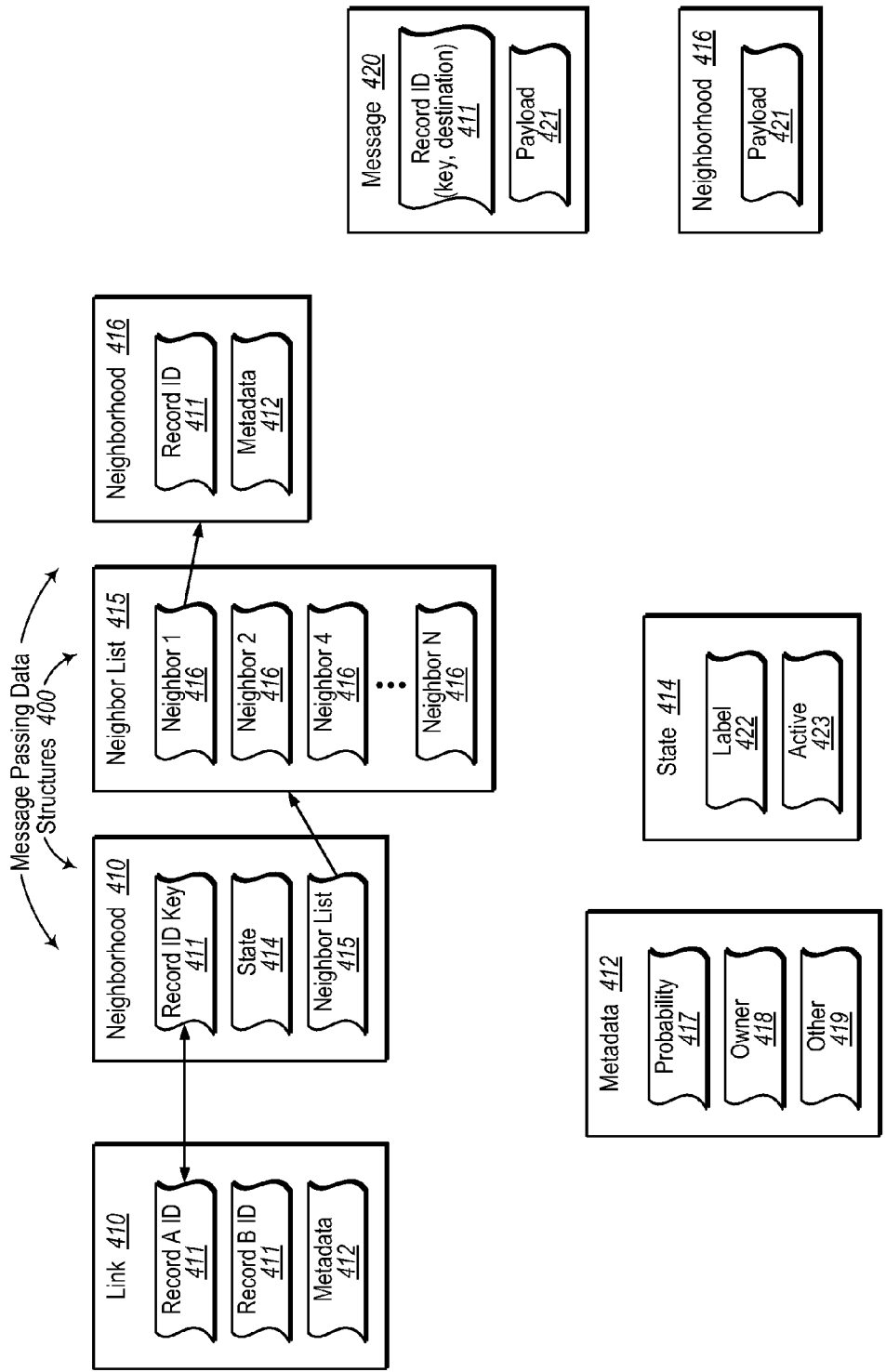
FIG. 4 illustrates example of message passing data structures.

FIG. 4 illustrates example of message passing data structures 400. As depicted a link 410 can include record A ID 411, record B ID 411, and metadata 412. Each record ID 411 can be used as a key for a neighborhood 413. Metadata 412 can contain probability 417, owner 418, and other 419. Probability 417 is a probability assigned by the algorithm creating links as an indication of its confidence in the link. In some embodiments, probability 417 can be considered when making decisions with respect to label updates. Owner 418 contains information which algorithm created this link. In some embodiments, multiple different models and a collection of rules can be used. The data in owner 418 can help identify the model or rule that created the link. Other 419 can contain other useful data, such as, for example, the date link was created.

Each neighborhood 413 is keyed by a record ID 411 can includes state 414 and neighbor list 415. State 414 contains label 422 and active 423. Label 422 stores the minimum record ID that has been identified as linked the record ID (Key) 411. Active 423 indicated whether or not the neighborhood 413 is active for messaged passing. Neighbor list 415 contains one or more neighbors 416. Each neighbor 416 is identifier by a record ID and also contains metadata 412.

As depicted, a message 420 contains a destination record ID and a payload 412. The payload 412 contains a label 422. Label 422 stores the minimum record ID that has been identified as linked the record ID (Key) 411 that sent the message 420.

Figure 5A:
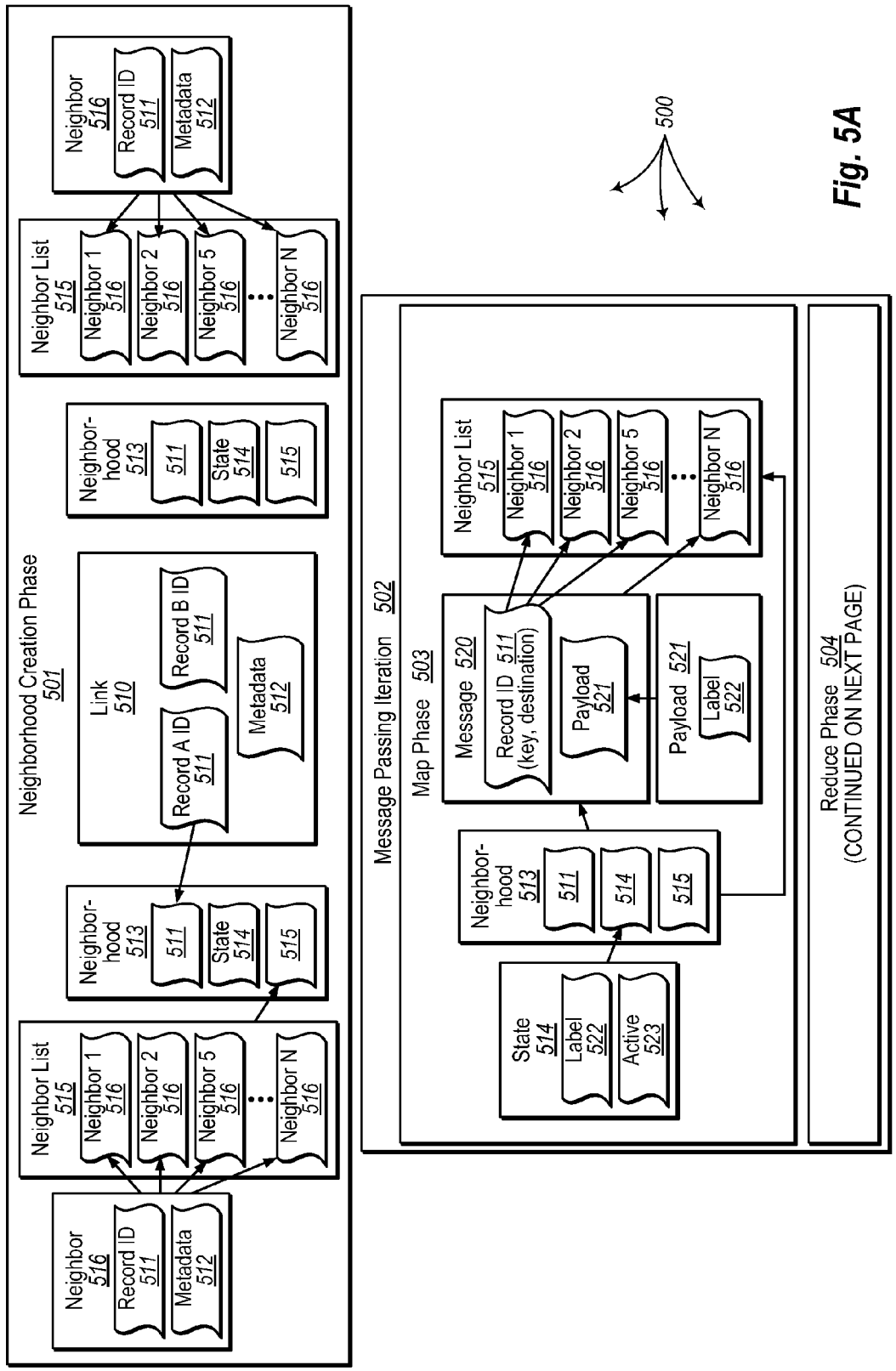
FIGS. 5A and 5B illustrate a data flow diagram of various different example phases used when resolving pairwise links into groups.
Figure 5B:
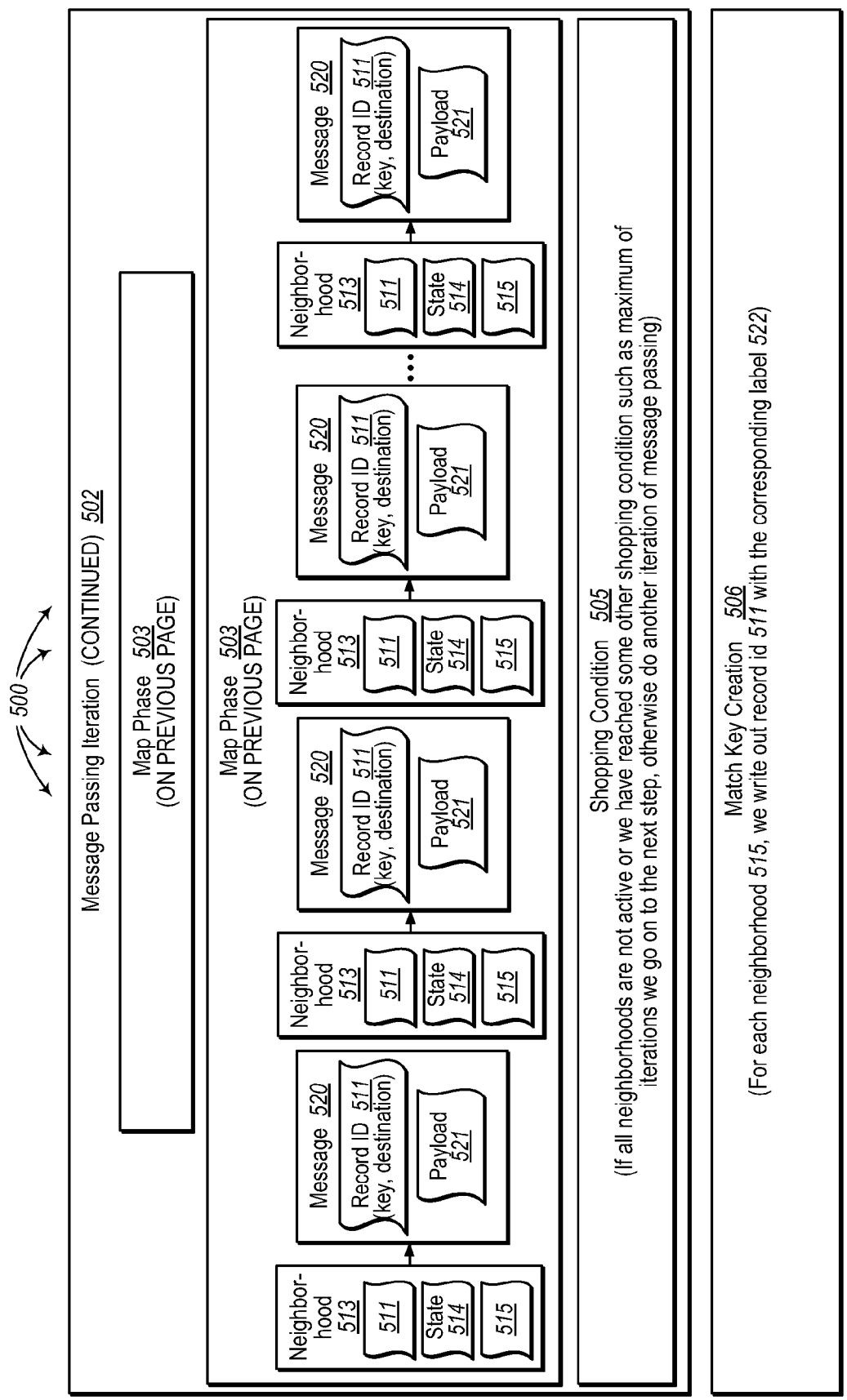

FIGS. 5A and 5B illustrate data flow diagram 500 of various different example phases used when resolving pairwise links into groups. FIG. 6 illustrates a flow chart 600 of an example method for resolving pairwise links into groups. Flow chart 600 will be described with respect to the phases and data elements in data flow diagram 500.

Method 600 includes grouping links 510 by record ID 511 such that each link 510 is in two groups. For each group, create a neighborhood 513 with an initial State 514 Of Active=True And Label=Record Id (601). In a neighborhood creation phase 501, a link 510 contains record A ID 511, record B ID 512, and metadata 512. Neighborhoods 513 are keyed to record A ID 511 and record B ID 512 respectively. Each neighborhood 513 contains state 514 and a neighbored list 515. Each neighborhood list contains a plurality of neighbors 516 identified by record ID 511 and also containing metadata 512. Similar references numbers are used to refer to similar elements, however the content of the elements may differ. For example, neighborhood lists 515 can differ by having different neighbors 516 identified by different record IDs 511, different neighbors 516 and links 510 can contain different metadata 514, etc.

For each neighborhood 513, if it is active 523, create messages 520 for each record Id 511 of a neighbor 516 in the neighbor list 515 with a payload 521 consisting of the current label 522 in state 514 of the neighborhood 513 (602). Moving to message passing iteration 502, message passing iteration 502 includes map phase 503. In map phase 503, messages 520 are generated for each neighbor 516 in a neighborhood 513. Messages 520 contain a destination record ID 511 for the corresponding neighbor 516 and a payload 521. The payload 521 contains the label 522 from state 514.

Messages 520 and neighborhoods 513 are grouped by record ID 511. Each group consists of one neighborhood 513 and some number of messages 520 (603). In each group the state 514 of the neighborhood 513 is updated as a function of the current state 514 and the payload 521 of the messages 520 (604). A function takes the minimum of the labels between the state and the messages as the new label for the state and set active to True if the label has changed and False otherwise (605). As depicted, message passing iteration 502 also includes reduce phase 504. In reduce phase 504, messages destination record IDs 511 in massages 502 are matched to record IDs 511 in neighborhoods. Labels 522 in payloads 521 are compared to labels 522 in state 514. The label having the minimum record ID 511 is stored in label 522 of state 514. Thus, if a message has a label 522 with a lower record ID 511, the lower record ID 511 replaces the record ID 511 in label 522 of state 514.

If all neighborhoods are not active or some other stopping condition has been reach, such as a maximum number of iterations, go on to the next stop. Otherwise, do another iteration of message passing (606). For example, when a stopping condition 505 is satisfied, message passing iterations 502 stop. If stopping condition 505 is not satisfied, message passing iterations 502 can continue. For each neighborhood 513, write out record ID 511 with the corresponding label 522 (607). For example, after message passing iterations 502 are stopped, match key creation 506 can write out record IDs 511 with corresponding labels 522.

Although the components and modules illustrated herein are shown and described in a particular arrangement, the arrangement of components and modules may be altered to process data in a different manner. In other embodiments, one or more additional components or modules may be added to the described systems, and one or more components or modules may be removed from the described systems. Alternate embodiments may combine two or more of the described components or modules into a single component or module.

Accordingly, embodiments of the invention use an iterative algorithm to transform a collection of pairwise links to groups of records that correspond to the same entity. The algorithm can be stopped after any number of iterations for an increasing accurate approximation result. The algorithm essentially guarantees a correct solution for groups of size up to the number of iterations. This algorithm scales linearly on the size of the record set, with little impact from the number of links. Thus, the algorithm can be used on large data sets, including data sets on the order of a billion records and a trillion links.

The foregoing description has been presented for the purposes of illustration and description. It is not intended to be exhaustive or to limit the invention to the precise form disclosed. Many modifications and variations are possible in light of the above teaching. Further, it should be noted that any or all of the aforementioned alternate embodiments may be used in any combination desired to form additional hybrid embodiments of the invention.

Further, although specific embodiments of the invention have been described and illustrated, the invention is not to be limited to the specific forms or arrangements of parts so described and illustrated. The scope of the invention is to be defined by the claims appended hereto, any future claims submitted here and in different applications, and their equivalents.

What is claimed:
1. A system comprising:
one or more processing modules; and
one or more non-transitory storage modules storing computing instructions
configured to run on the one or more processing modules and perform acts of:
accessing one or more neighborhood data structures, at least a portion of the one or more neighborhood data structures are active, and the one or more neighborhood data structures each comprise:

a label comprising a record identifier, the record identifier corresponding to a specified record of one or more records;
a neighborhood comprising a list of record identifiers for other records linked to the specified record of the one or more records by a pairwise link; and
a message for each of the other records linked to the specified record of the one or more records, the message comprising the label and an activity state indicator, the activity state indicator indicating if the one or more neighborhood data structure is active;
grouping one of the one or more neighborhood data structures and the message for the one of the one or more neighborhood data structures by the record identifier of the one of the one or more neighborhood data structures;
setting the label for the one of the one or more neighborhood data structures in the group to a minimum record identifier; and
removing the one of the one or more neighborhood data structures from the one or more neighborhood data structures that are active when the minimum record identifier for the one of the one or more neighborhood data structures is the record identifier for the specified record of a particular neighborhood data structure of the one or more neighborhood data structures.

2. The system of claim 1, wherein: removing the one of the one or more neighborhood data structures from the one or more neighborhood data structures that are active by setting the activity state indicator to indicate that the one of the one or more neighborhood data structures is not active.

3. The system of claim 1, further comprising: performing the acts for one or more iterations over the one or more records until a stop condition is satisfied.

4. The system of claim 3, further comprising: writing out the label for each neighborhood data structure of the one or more neighborhood data structures.

5. The system of claim 3, wherein: the stop condition indicates a specified maximum number of the one or more iterations to perform.

6. The system of claim 3, wherein: the stop condition is based at least in part on detecting that no neighborhood data structures of the one or more neighborhood data structures are active.

7. The system of claim 1, wherein: the minimum record identifier is based at least in part on a lexicographical order associated with the record identifiers.

8. The system of claim 1, wherein: one or more of the one or more records is associated with a retail purchase transaction.

9. A method comprising:
accessing one or more neighborhood data structures, at least a portion of the one or more neighborhood data structures are active, and the one or more neighborhood data structures each comprise:
a label comprising a record identifier, the record identifier corresponding to a specified record of one or more records;
a neighborhood comprising a list of record identifiers for other records linked to the specified record of the one or more records by a pairwise link; and
a message for each of the other records linked to the specified record of the one or more records, the message comprising the label and an activity state indicator, the activity state indicator indicating if the one or more neighborhood data structure is active;
grouping one of the one or more neighborhood data structures and the message for the one of the one or more neighborhood data structures by the record identifier of the one of the one or more neighborhood data structures;
setting the label for the one of the one or more neighborhood data structures in the group to a minimum record identifier; and
removing the one of the one or more neighborhood data structures from the one or more neighborhood data structures that are active when the minimum record identifier for the one of the one or more neighborhood data structures is the record identifier for the specified record of a particular neighborhood data structure of the one or more neighborhood data structures.

10. The method of claim 9, wherein: removing the one of the one or more neighborhood data structures from the one or more neighborhood data structures that are active by setting the activity state indicator to indicate that the one of the one or more neighborhood data structures is not active.

11. The method of claim 9, further comprising: performing acts for one or more iterations over the one or more records until a stop condition is satisfied.

12. The method of claim 11, further comprising: writing out the label for each neighborhood data structure of the one or more neighborhood data structures.

13. The method of claim 11, wherein: the stop condition indicates a specified maximum number of the one or more iterations to perform.

14. The method of claim 11, wherein: the stop condition is based at least in part on detecting that no neighborhood data structures of the one or more neighborhood data structures are active.

15. The method of claim 9, wherein: the minimum record identifier is based at least in part on a lexicographical order associated with the record identifiers.

16. The method of claim 9, wherein: one or more of the one or more records is associated with a retail purchase transaction.

17. A computer program product comprising non-transitory one or more computer storage devices having stored thereon computer-executable instructions that, when executed at a processor, perform acts comprising:
accessing one or more neighborhood data structures, at least a portion of the one or more neighborhood data structures are active, and the one or more neighborhood data structures each comprise:
a label comprising a record identifier, the record identifier corresponding to a specified record of one or more records;
a neighborhood comprising a list of record identifiers for other records linked to the specified record of the one or more records by a pairwise link; and
a message for each of the other records linked to the specified record of the one or more records, the message comprising the label and an activity state indicator, the activity state indicator indicating if the one or more neighborhood data structure is active;
grouping one of the one or more neighborhood data structures and the message for the one of the one or more neighborhood data structures by the record identifier of the one of the one or more neighborhood data structures;
setting the label for the one of the one or more neighborhood data structures in the group to a minimum record identifier; and removing the one of the one or more neighborhood data structures from the one or more neighborhood data structures that are active when the minimum record identifier for the one of the one or more neighborhood data structures is the record identifier for the specified record of a particular neighborhood data structure of the one or more neighborhood data structures.

18. The computer program product of claim 17, wherein:
removing the one of the one or more neighborhood data structures from the one or more neighborhood data structures that are active by setting the activity state indicator to indicate that the one of the one or more neighborhood data structures is not active.

19. The computer program product of claim 17, wherein:
the computer-executable instructions that, when executed at the processor, perform further acts comprising:
performing the acts for one or more iterations over the one or more records until a stop condition is satisfied.

20. The computer program product of claim 19, wherein:
the stop condition is based at least in part on detecting that no neighborhood data structures of the one or more of neighborhood data structures are active.

\* \* \* \* \*